Nov. 29, 1938.  V. D. BEEHLER  2,138,621

GAS VALVE

Filed Sept. 26, 1936

Vernon D. Beehler
INVENTOR.

Patented Nov. 29, 1938

2,138,621

UNITED STATES PATENT OFFICE 2,138,621

GAS VALVE

Vernon D. Beehler, Evanston, Ill., assignor to The Imperial Brass Manufacturing Company, Chicago, Ill.

Application September 26, 1936, Serial No. 102,748

9 Claims. (Cl. 251—152)

My invention relates to valves and particularly to shut off valves for fluid lines.

The object of my invention is the provision of a new and improved valve device having a regulated partial shut off position.

Another object is the provision of a new and improved valve device having a body and a rotating valve member which is operable between two fixed positions and equipped with a temporary detent carried by the rotating member cooperable with the body and held resiliently in position by the main valve spring.

Still another object is a valve device operable between two stop positions which is equipped with an adjustable pin carried by the rotating member capable of regulating a position at which the valve may be stopped.

A further object is to provide a valve device which can be rotated from a closed to a full open position, and beyond in the same direction to a partial open position, there being included a pin carried by the valve member whose position can be varied to adjust the extent of partial open position, the pin being adjustable through the stem from a point outside the valve.

A still further object is the provision of a valve having pin adjustment carried by the rotating member for setting the height of a flame at a partial open position and cooperable with a temporary detent to indicate a position between the closed position and the partial open position, both the detent and the rotating member being acted upon a single resilient element.

Further objects and advantages of my invention will become apparent as the description proceeds, taken in connection with the accompanying drawing which forms a part of this specification.

Figure 1:
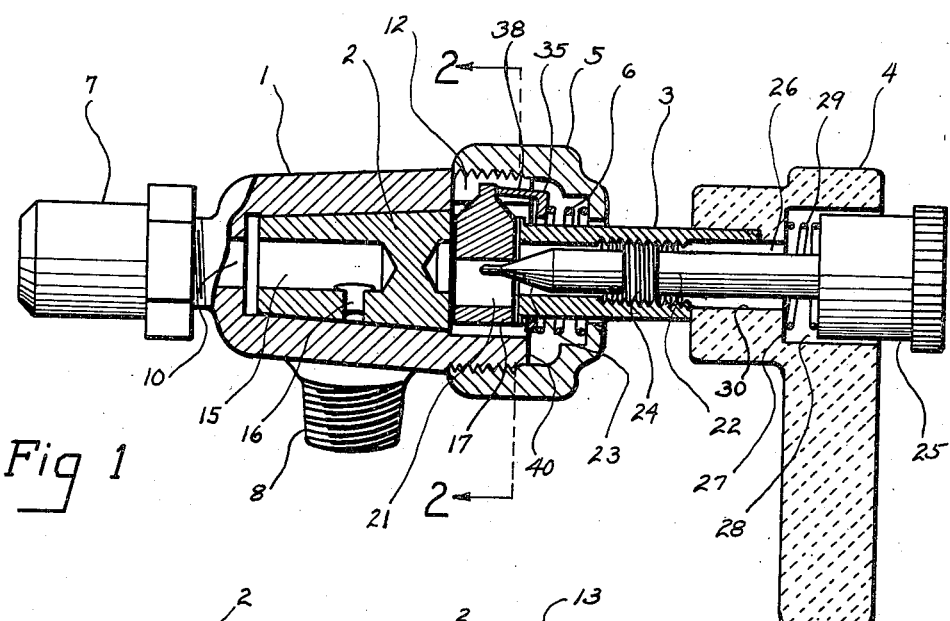
Fig. 1 is a longitudinal section of the device.

For the purpose of disclosure I have illustrated in the drawing and shall describe in detail the preferred embodiment of my invention with the understanding that I do not intend to limit my invention to the embodiment shown, it being contemplated that various changes may be made by those skilled in the art without departing from the spirit and scope of the appended claims.

On gas appliances and particularly on kitchen ranges the demand has been felt for a valve which can be adjusted to a desired simmer position dispensing with the necessity of a careful manual turn-down when it is desired to prevent food from cooking too fast. It is particularly advantageous because of constant variations of gas pressure at different times of the day or between different parts of a city, to have such an adjustable feature operated from a point outside the gas range so that nothing need be disassembled in order to change the setting. In response to this demand the present device is designed to supply an adjustment for the simmer position, which can be operated from the valve handle. By such an arrangement the housewife herself can set the simmer for any particular need when variations in pressure in the gas line alter a previous setting. By proper arrangement of parts it is made impossible to turn the simmer down to a point when it is completely out, thereby assuring absolutely safe operation by inexperienced persons.

In the drawing the valve body 1 is shown with a plug valve 2 inserted therein having a stem 3 and a handle 4 for turning it off and on. A cap 5 retains a spring 6 for holding the parts of the valve in assembled relation. At the left of the valve at the exit is a conventional orifice cap 7.

The body has a male threaded extension 8 for screwing into a gas range manifold and an inlet passage 9 to conduct gas or other fluid into the valve device. The exit from the valve is at the passage 10 and thence outward through the orifice cap 7. On the top side of the body a portion is milled away to form two shoulders or projections 11 and 12 and a space 13 left by the milling operation.

The plug valve 2 has the conventional operation with regard to turning the valve device off and on. A hole 15 is drilled in from the open end and a lateral passage 16 leads from it to the inlet passage 9. Near the top of the plug portion of the valve a lateral hole 17 is drilled which is filled by the pin 18 in a loose sliding fit. The pin has a tapered end 19 terminating in a knob 20. In the pin is also a large cross hole 21. A rod 22, shown in the form of a screw, runs lengthwise of the handle and has a progressively reduced end portion 23 which enters the cross hole 21 of the pin. A threaded portion 24 of the rod operates with a corresponding threaded portion in the stem 3 by means of which the rod can be adjusted in and out. At the end of the rod opposite the reduced end a turn button 25 is attached by means of which the rod is screwed in and out. When the rod is screwed in the reduced end 23 bears against the upper edge of the hole 21 in the pin and tends to push it upwards as viewed in Figs. 1, 2 and 3 so that the tapered end 19 and knob 20 of the pin protrudes outward. A reverse action can be had by unscrewing the rod so that the reduced end recedes from the cross hole 21. The pin thereby is allowed to slip back as far as permitted by its contact with the reduced end of the rod. The position of the pin 18 is directly responsible for the amount of opening the valve device has at the partial open position.

Figures 2, 3:
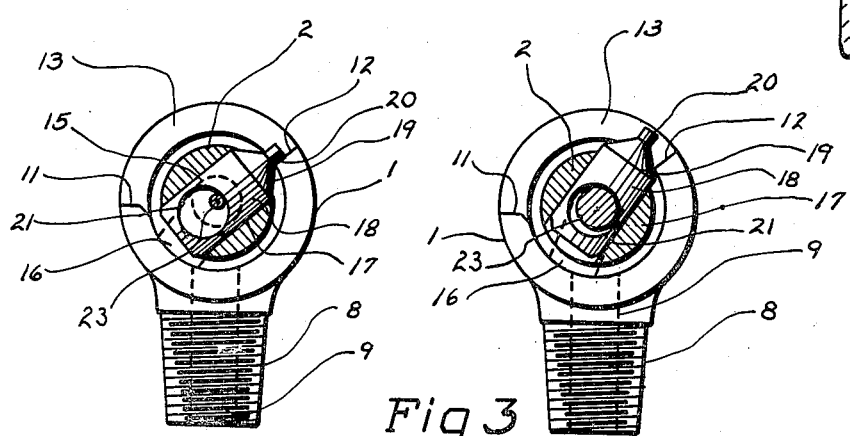
Figs. 2 and 3 show sections on the line 2—2 of Fig. 1 at different degrees of adjustment.
Figures 4, 5:
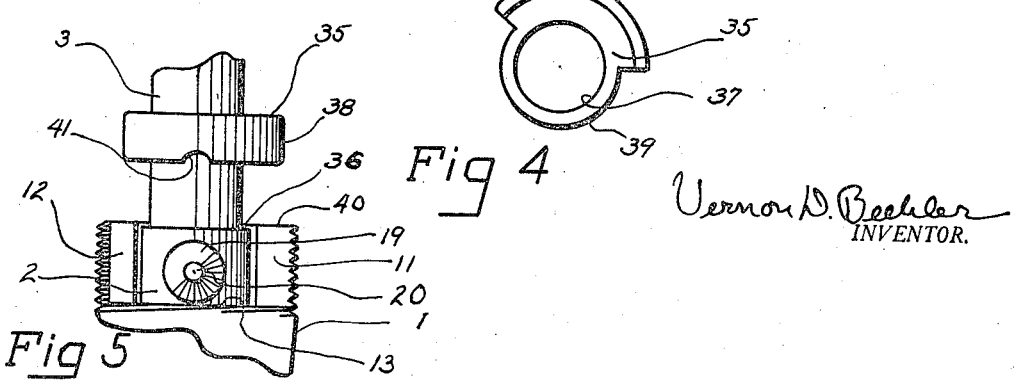
Fig. 4 is a view of the washer which constitutes a temporary detent.
Fig. 5 is a fragment of the top of the body showing the washer above it ready to be positioned thereon.

Reference to Figs. 2 and 3 will indicate the operation. When the valve is off the knob 20 will bear against the projection or shoulder 11 and passages 9 and 16 will be at off position, completely out of register. When the plug valve is rotated clockwise, past full open position, to the position shown in Fig. 2 the knob 20 will abut the shoulder or projection 12. In this position it will be noted that the passage 16 is partially in register with the inlet passage 9 to allow passage of a small amount of gas. This is often termed a simmer position and is so termed herein. When the rod 22 is screwed into the stem the reduced end 23 pushes the pin upward as in Fig. 3. A part of the tapered end 19 of the pin 17 will then abut the shoulder 12 and limit rotation of the plug valve at a position shown in Fig. 3. At this point the partial registration between the passages 16 and 9 is considerably greater and a different and higher simmer adjustment is had. Naturally all intermediate simmer adjustments can be made by moving the rod in or out a greater or less amount. When the rod is withdrawn, merely rotating the valve plug toward the right will push the tapered end 19 against the shoulder 12 which will tend to slide the pin 17 back into the hole without the necessity of using a spring. The distance the pin can be forced back into the hole will be limited by the position of the reduced end 23 of the rod 22.

The handle 4 is provided with a hole 26 large enough so that the entire rod 22 can be inserted through it from the outside. The bottom 27 of the hole 28 forms a base against which a spring 29 may exert its force. The spring being retained under the turn button 25 holds the handle in place on the stem and puts a tension on the rod 22 to prevent it from rotating accidentally. The hole 26 in the handle is made flat on one side to correspond with a flat face on the stem so as to key the handle to the stem to prevent it from slipping when rotated.

A click stop or temporary detent is provided at full open position of the valve device. To accomplish this a washer 35 is fashioned to fit over and against a shoulder 36 of the valve plug 2. A central hole 37 in the washer is made larger in diameter than the stem 3 so that the sufficient clearance will allow the washer to tilt freely. There is a depending skirt 38 on the washer having a circumferential length sufficient to loosely fit the space 13 between the shoulders 11 and 12 on the body. The radius of the rim 39 on the opposite side of the washer is less than the radius on the inside of the top edge 40 of the body 1 to permit the washer to bear freely and directly upon the plug valve.

On the bottom edge of the skirt 38 a recess 41 is formed into which the knob 20 of the pin 18 may be temporarily held. The recess is at a point such that its engagement with the knob occurs at full open position of the valve device. The valve spring 6 bears against the washer and pushes it against the valve plug 2 and the pin 17. The edges of the skirt 38 by bearing against the shoulders 11 and 12 prevent its being rotated with the valve plug. When the knob 20 and the recess are not engaged the washer is tilted slightly as shown in Fig. 1. Due to the loose fit of the skirt between the shoulders, when the knob 20 bears frictionally against the edge it shifts the washer slightly in a rotative direction. Then when the knob is at the edge of the recess the spring action snaps the recess backward slightly and down over the knob with a pronounced click and holds it there subject to a stronger twist of the handle which will release it.

There has thus been provided a novel compact valve completely equipped with a simmer adjustment which when used on a range or other piece of equipment, can be completely adjusted from a point outside, there being included as part of the device a click stop, functioning with the simmer adjustment, to indicate an intermediate position. What I claim, therefore, and seek to secure by Letters Patent is:

1. A gas cock having an adjustable simmer comprising a body, a rotating valve plug therein having a stem and handle attached, a cap on the body and a spring thereunder for holding the plug in place, the plug having a single inlet port, and the body having a corresponding port registerable therewith at a definite stage of rotation, stop shoulders on the body for limiting rotation at either side of said stage, means forming a radial passage across the plug and a movable pin therein having a tapered end positioned to abut the stop shoulders at closed and at a partial open position respectively, said pin having a lateral passage, a threaded rod in the stem having an end of diminishing cross section insertable into the passage and movable in and out so as to engage the wall of the passage at different points along diminishing end and subject said pin to a corresponding lateral movement, said pin in response to said movement being operable to abut one of the shoulders at different points along its tapered end causing different degrees of partial opening of said cock, the handle having an opening for the rod and means on the rod having a shoulder for holding the handle on the stem, and a loose washer having a depending skirt portion adapted to loosely fit the space between the shoulders on the body with a recess in the skirt forming a temporary detent for the pin, the spring being operable against the washer and indirectly against the plug to releasably impress said washer against the pin.

2. A gas cock having an adjustable simmer comprising a body, a rotating valve member engageable therewith having a stem and handle attached, a cap on the body and a valve spring thereunder for holding the valve member in place, said valve member having a single inlet port and the body having a corresponding port registerable therewith at a definite stage of rotation, projections on the body for limiting rotation at either side of said stage, means forming a passage across the valve member and a movable pin therein having a tapered end, a rod in the stem having an end of diminishing cross section movable in and out to engage the pin at different points along said end and to subject said pin to a corresponding lateral movement, said pin being operable by reason of said movement to engage one of the body projections at different points along the tapered end limiting said cock to different degrees of partial opening, the rod having means thereon engaging the handle to secure the handle to the stem and a loose washer having a depending skirt portion adapted to fit the space between the body projections with a recess in the skirt forming a temporary detent for the pin to indicate full open position of the cock, the valve spring being operable against the washer to impress said washer into operative position.

3. A gas valve device having an adjustable simmer comprising a body, a rotating valve member engageable therewith having a stem and handle attached, a cap on the body and means associated therewith for holding the valve member in place, said member having a single inlet port and the body having a corresponding port registerable therewith at a definite stage of rotation, projections on the body for limiting rotation at either side of said stage, means forming a passage across the valve member and a movable pin therein having a tapered end, a rod in the stem having a reduced end portion movable in and out to engage the pin at different points along said reduced end portion operable to impart a corresponding lateral movement to the pin, said pin being operable by reason of said movement to engage one of the body projections at different points along the tapered end limiting said valve to different degrees of partial opening, the rod having means thereon engaging the handle to secure the handle to the stem, a loose washer having a portion adapted to fit the space between the body projections, and means on the washer forming a temporary detent for the pin to indicate a prechosen position of the valve.

4. A gas cock having an adjustable simmer comprising a body, a rotating valve member having a stem and handle attached, resilient retaining means on the body for holding the valve member in place, said valve member having an inlet port and the body having a corresponding port registerable therewith at a certain stage of rotation, fixed stop means integral with the body for limiting rotation at either side of registration, means forming a passage across the valve member and a movable pin therein having a protruding tapered end engageable with said stop means and a small knob at the apex of the tapered end, a means for adjusting said pin so as to engage one of said stop means at different points along said tapered end limiting said cock to different stages of partial opening and alternatively to engage said stop means at the knob to fix a minimum partial open position, detent means loosely engageable with the body between the stop means thereon provided with a depending skirt element having means forming a recess wider than the breadth of the knob received therein so that the knob when passing the edge of the recess just prior to complete registration of the ports rotates said detent means in reverse direction in order to be received suddenly into the recess with an audible click, the resilient retaining means being operable against said detent means to hold it in place.

5. A gas valve device comprising a body, a rotary valve having a stem and a handle attached thereto, retaining means on the body and a spring operable therewith for holding the valve in place, said valve and said body being ported for opening and closing the device, fixed obstructions on the body, engaging means carried by the valve having a variable engagement with said obstructions at a plurality of positions between maximum and minimum positions, means carried by the stem having a plurality of positions corresponding to the positions of said engaging means for adjusting the position of said engaging means to vary the rotative position at which the valve will be stopped.

6. A gas valve device comprising a body, a rotary valve element having a stem and a handle attached, a spring and a retaining means on the body for holding the valve in place, said valve and said body being ported for opening and closing the valve device, a projection on the body, means lying in the plane of rotation and carried by the valve positionable to set up a variable engagement with the projection on the body, extension means associated with the stem having a plurality of positions between maximum and minimum positions movable to adjust the position of the first means correspondingly and operable thereby to vary the rotative position at which the valve may be stopped at said projection.

7. A valve device comprising a body, a rotating valve having a stem and a handle attached thereto, retaining means on the body and a valve spring operable therewith for holding the valve in place, said valve and said body being ported for opening and closing the valve device, fixed obstructions on the body, means carried by the valve having a variable engagement with one of said obstructions and external adjusting means to position said first means having a maximum, minimum and intermediate positions adapted to vary one of the rotative positions at which the valve will stop, means engaging the obstructions impressed against the valve by the valve spring having an engaging means thereon operable with said first means to form a temporary detent between stop positions of the valve.

8. An adjustable valve comprising a body, a rotating valve element having a stem attached thereto and a handle on the stem, fixed obstructions on the body, an adjustable limiting means in the valve element co-operable with the obstructions to limit the rotation of the valve element at off position and at a partial open position, the limiting means being adjustable to regulate the extent of partial open position, external means carried by the valve having a maximum, minimum and intermediate positions on the body for setting the limiting means at corresponding positions for controlling said limiting means, and means forming a temporary detent interengaging the obstructions and co-operable with the limiting means at a position between the extreme positions of said limiting means.

9. An adjustable valve comprising a body, a rotating valve element having a stem attached thereto and a handle on the stem, an adjustable limiting means in the valve element co-operable with the body to limit the rotation of the valve element at a partial open position, rotatable external means carried by the valve and extending through the handle having maximum, minimum and intermediate stationary positions for controlling said limiting means, means forming a temporary detent interengaging the body and co-operable with the limiting means at an intermediate position.

VERNON D. BEEHLER.